United States Patent [19]

Wittrisch

[11] Patent Number: 5,016,727

[45] Date of Patent: May 21, 1991

[54] METHOD AND DEVICE OF SEISMIC PROSPECTION IN WELLS AND PARTICULARLY DEVIATED WELLS

[75] Inventor: Christian Wittrisch, Rueil-Malmaison, France

[73] Assignee: Institut Francais du Petrole, Rueil Malmaison, France

[21] Appl. No.: 505,902

[22] Filed: Apr. 6, 1990

[30] Foreign Application Priority Data

Apr. 6, 1989 [FR] France .................. 89 04554

[51] Int. Cl.$^5$ .................. G01V 1/40; E21B 47/00
[52] U.S. Cl. .................. 181/102; 181/104; 367/911; 367/25; 166/250
[58] Field of Search .................. 367/25, 75, 911; 181/102, 103, 104, 105, 106, 113; 166/250

[56] References Cited

U.S. PATENT DOCUMENTS

| | | | |
|---|---|---|---|
| 4,349,072 | 9/1982 | Escaron et al. | 166/250 |
| 4,578,785 | 3/1986 | Gelfand | 367/911 |
| 4,588,243 | 5/1986 | Ramsey et al. | 166/65.1 |
| 4,690,214 | 9/1987 | Wittrisch | 166/250 |
| 4,701,890 | 10/1987 | Ohmer et al. | 367/25 |
| 4,799,546 | 1/1989 | Hensley et al. | 166/250 |

Primary Examiner—Ian J. Lobo
Attorney, Agent, or Firm—Antonelli, Terry, Stout & Kraus

[57] ABSTRACT

A method and device are disclosed particularly adapted for seismic prospection in substantially horizontal drains using intermediate frequency acoustic waves for conciliating the range and the power of resolution. In a well is lowered steps-by-steps a transmission-reception assembly comprising at least one probe associated with a guide block but able to be mechanically uncoupled therefrom, and at least one acoustic wave source associated with a guide block. The source is inserted in a rigid column connecting the probe to the surface control device. A delayed connection system makes it possible to connect the probe and the source electrically to a surface control and recording assembly. The source comprises one or more vibrators transmitting in the 200-2000 Hz band for example or a sparker.

18 Claims, 7 Drawing Sheets

METHOD AND DEVICE OF SEISMIC PROSPECTION IN WELLS AND PARTICULARLY DEVIATED WELLS

BACKGROUND OF THE INVENTION

1. Field of the Invention

The invention relates to a method and device for prospection in wells and particularly deviated wells, comprising the use of transmission-reception means located in the same well portion. The term deviated wells should be understood to mean wells that are at least partially horizontal or very highly inclined with respect to the vertical.

More particularly, the invention relates to the seismic recording of a subsoil zone through which a horizontal well portion passes, the investigation range and resolution being intermediate between those generally obtained with sonic well-logging probes and those which are possible using conventional seismic prospection methods at a great distance.

Well-logging tools generally comprise, in the same body, one or more transmission members capable of generating acoustic signals in a frequency range of about 20 to 25 kHz and one or more corresponding receiving members. Such tools are well adapted to the fine study of wells or their immediate environment. To obtain a great range, very low frequency seismic waves are usually used in the range between 10 and 200 Hz for example, with an attendant disadvantage of very poor resolution. The seismic pulse source is generally disposed on the surface and the waves reflected by the underground discontinuities are picked up by one or more geophones housed in the body of the probe lowered into a well.

It is interesting for geophysicists to have seismic recordings concerning a relatively extensive zone of the ground through which wells pass and particularly deviated wells which are drilled through sedimentary basins for better studying the configuration thereof. The intermediate range required makes it necessary to use acoustic waves of a frequency much lower than those of well-logging probes. But the most interesting results can only be obtained by significantly increasing the distance separating the acoustic wave transmitters and receivers. This may be achieved without too much difficulty in vertical wells or well portions using if required a well tool comprising at least one satellite probe suspended at a certain distance under a main probe. But such an arrangement becomes inoperative in the case of highly deviated wells and particularly in horizontal well portions because of the difficulties of advancing and handling the probes.

2. Description of the Prior Art

Intermediate frequency acoustic waves have already been used in wells. From U.S. Pat. No. 4,542,487, there is known a seismic prospection system comprising a source disposed at the surface which transmits acoustic waves in an intermediate frequency range up to 300 Hz. The waves are received by different geophones in the body of a well probe. With such an arrangement in which the source remains at the surface the useful depth of penetration of the probe is restricted for the highest frequencies of the frequency range considered. In addition, the device described does not lend itself to use in a very deviated well portion. U.S. Pat. No. 4,394,754 may also be mentioned as describing the use in a well of an assembly formed of a transmitter emitting acoustic vibrations at a frequency of 1 kHz and two receivers spaced apart by a few meters. It should be noted that such an assembly is not adapted either for operating in very deviated well portions and that the distance between the transmitter and the receivers is here very small.

In the European patent application 246 148 a seismic prospection method is described particularly applicable in well portions slightly inclined with respect to the horizontal. It comprises the use of one or more acoustic wave transmitters whose frequency is in the 5000 to 10000 Hz band and so below that in which well-logging probes generally operate. The waves reflected by the discontinuities surrounding the well are received by one or more piezoelectric sensors. The transmitters and receivers are disposed in a single well probe fixed at the end of a drill string and pushed as far as the deviated zone to be studied. The maximum spacing between the transmitters and receivers is about 10 meters or so. Such an arrangement is suitable for obtaining well logs in a widened zone about a well. But it lends itself poorly to seismic prospection operations at frequencies appreciably lower because the type of receivers used does not discriminate between the upgoing and downgoing waves. The relatively reduced spacing between the transmitters and receivers, imposed by their arrangement in a single probe, also provides a limitation.

SUMMARY OF THE INVENTION

The method according to the invention is well suited for exploration in wells and particularly in deviated well portions with acoustic waves in an intermediate frequency band between the very low frequency seismic band and the range of frequencies higher than 10 kHz generally used for sonic logging. It is characterized in that it comprises:

(a) introduction into the well of an acoustic wave transmission-reception assembly comprising:
- reception means having at least one probe with directional sensor means and means for applying said sensor means against the wall of the well, said probe being connected to a surface control device by a rigid column and being able to be mechanically uncoupled therefrom intermittently,
- acoustic wave transmission means comprising at least one acoustic wave source inserted in the column between the probe and the control device,
- a multi-conductor cable for connecting the transmission-reception assembly to a control and recording assembly disposed on the surface, and
- a delayed connection system for automatically providing the electric connection between successively the source and the probe after the latter has been lowered into the well and between the control and recording assembly and said source after the latter has been lowered in the well, (b) mechanical uncoupling of the probe from the rigid column and application of said sensor means against the wall of the well, (c) said sensor means being held in a fixed position, transmission of the acoustic waves by the source being triggered from the control and recording assembly, (d) transmission to the control and recording assembly by the multi-conductor cable of signals reflected by the discontinuities surrounding the well and received by the sensor means, (e) repetition of the two preceding steps at a plurality of positions in the well where the transmission-reception assembly is successively brought by pulling on the rigid column, and (f) re-establishment of the mechanical coupling of the probe with the rigid column.

By a judicious choice of the distance between the probe and the source which may be changed readily by adding or removing therebetween a certain number of tubing sections and transmitting acoustic wave whose power of resolution in the ground through which the well passes is for example of the order of a meter, relatively fine seismic sections can be obtained with a range of 50 to 100 meters, which is very useful for exploring zones recognized as interesting.

The exploration device according to the invention comprises at least one well probe having a cross section adapted to that of the well to be explored with directional sensor means and means for coupling said sensor means with the wall of the well, a rigid tubular column for connecting the probe to a control installation on the surface, a multi-conductor cable for connecting the probe to a surface control and recording assembly. It is characterized in that it comprises transmission means inserted in said column between the probe and the control installation and comprising at least one wave source.

The device may for example comprise a delayed connection system for providing electric interconnection on the one hand between the source and the probe after the latter has been lowered into the well and on the other hand between the control and recording assembly and the source after the latter has been lowered into the well.

In one embodiment, the probe and the source are associated respectively for example with two guide blocks each comprising a tubular body fixed to the rigid column and a guide element movable in the body between a withdrawn position and an advanced position, means for locking the two guide elements in the withdrawn position with respect to said tubular bodies and means, cooperating with the two guide elements for pushing the latter towards their respective advanced positions, the probe being mechanically uncoupled from the associated tubular body in said advanced position.

The connection system may comprise a first electric connection plug fixed to the guide element associated with the probe, a first electric socket usable in a liquid environment connected to a first multi-conductor cable element which is connected to said source, a second electric connection plug fixed to the guide element associated with the source, a second electric socket usable in a liquid environment and connected to a second multi-conductor cable element, which is connected to said central control and recording assembly, guide means for the first and second sockets permitting their electric connection to the two corresponding plugs and means for providing a flow of fluid in said column, so as to push said sockets towards their engagement positions in contact respectively with the two plugs, and means for locking said sockets in the engaged position.

The source comprises for example at least one vibrator of the piezoelectric or magnetostrictive type associated with means for generating continuous or pulsed vibratory signals or else a sparker.

The reception means may comprise several directional sensors such as geophones or accelerometers whose axes are directed in different directions, these sensors being disposed for example on a support which is orientable with respect to the body of the probe.

The source may comprise several elements spaced apart from each other along the rigid column. Similarly several probes may be spaced apart from each other along the rigid column.

In a second embodiment, the source is fixed to the body of its guide block and comprises a passage along its axis, for the combined displacement of the two guide elements when they are connected together by the multi-conductor cable, the device also comprising auxiliary conducting means for connecting the source to the same multi-conductor cable.

BRIEF DESCRIPTION OF THE DRAWINGS

Other features and advantages of the method and device of the invention will be clear from the following description, with reference to the accompanying drawings in which.

DESCRIPTION OF THE PREFERRED EMBODIMENTS

Figures 1A, 1B:
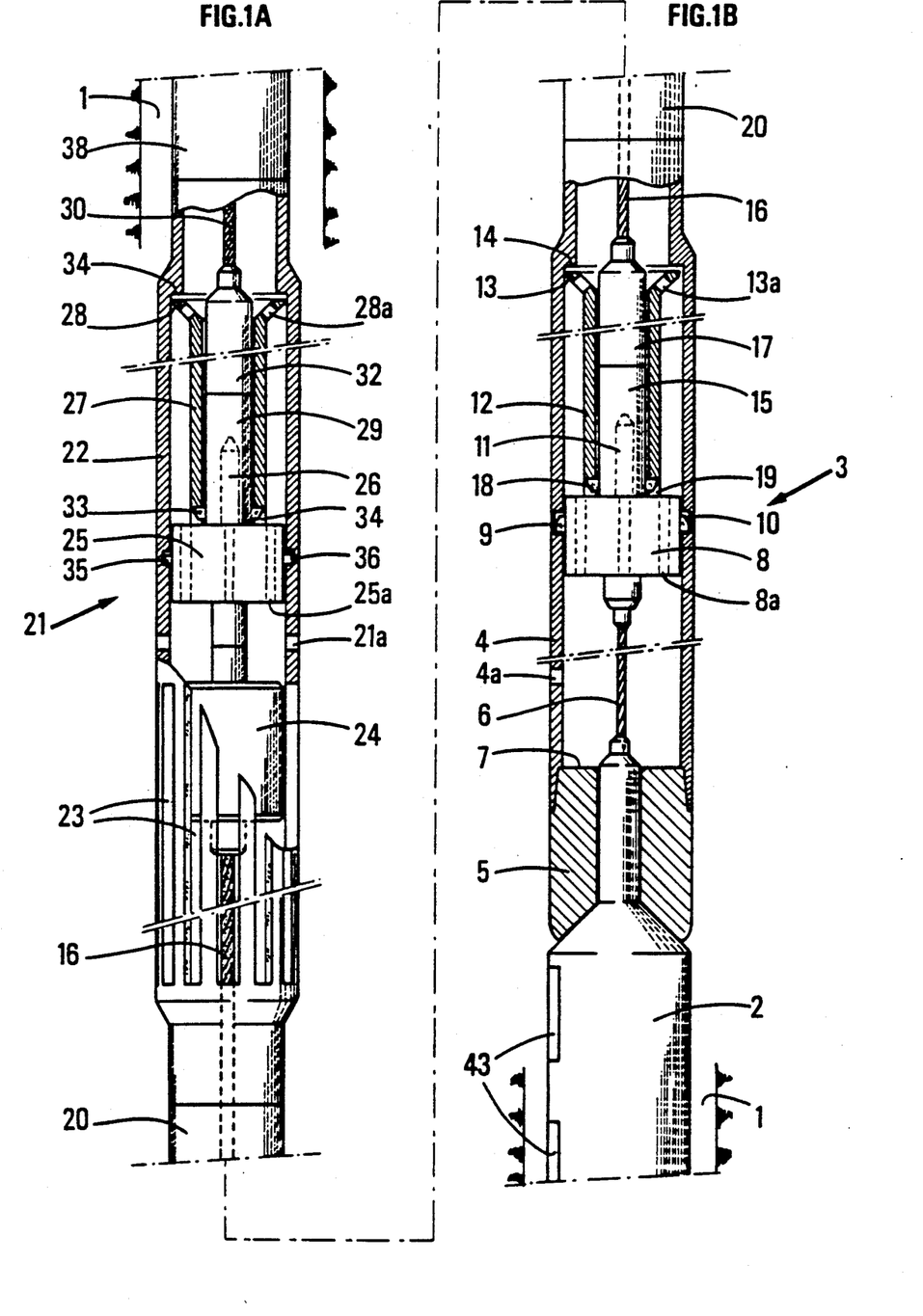
FIGS. 1A and 1B show an embodiment of the transmission-reception assembly comprising a transmission source and a measuring probe spaced apart from each other along a rigid column.

The transmission-reception assembly shown in FIG. 1 in the interconnected position is adapted to be lowered into a well 1. It comprises a measurement probe 2 associated with a guide block 3 similar to that described in the published French patent application 2 609 105. Guide block 3 comprises a tubular body 4 with an endpiece 5 at one end. The outer wall of this end-piece is widened. Its form is adapted to that of the end of the probe so as to center the latter when it bears against the end-piece. A connection cable 6 passing through an opening 7 in endpiece connects the upper end of probe 2 to a guide element 8 movable inside the tubular body 4 between a withdrawn position (FIG. 1) and an advanced position closer to end-piece 5. Locking means lock the guide element 8 in the withdrawn position. They may be formed for example by electrically or electro-hydraulically controlled dogs 9 actuated from the surface, which engage in grooves 10 in the tubular body. The length of cable 6 is chosen so that the probe is firmly in abutment on the end-piece in the withdrawn position of guide element 8. On the side opposite cable 6 and connected thereto, the guide element 8 comprises a multi-contact male plug 11 oriented along the axis of body 4 and a tubular extension 12 of a cross section less than that of body 4, ending in a collar 13. The latter abuts against an internal shoulder 14 of the body in the withdrawn position of the guide element. Collar 13 serves for guiding a female socket 15 towards the male plug 11. The female socket 15 is connected to the different conductors of a multi-conductor cable 16. The socket 15 has mounted thereover a tubular weighting bar 17 of substantially equal cross section. Locking means 18 lock the female socket to the guide element 8 when it is engaged on the male plug 11. For this, remote controllable dogs 18 can be used which engage in grooves 19 at the base of the tubular extension 12.

Examples of electric connectors using this type of multi-contact male plug and mating female socket are described for example in the U.S. Pat. No. 4,500,155.

Openings 4a and 13a are formed in collar 13 and the wall of body 4 and the guide element has passing therethrough channels so that a fluid stream may flow between the inside and outside of the tubular column.

Figure 6:
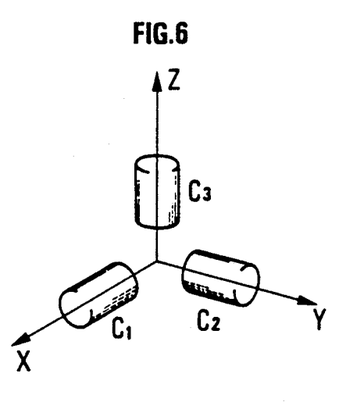
FIGS. 6 and 7 show two different methods of orientation in the directional sensor space included in each probe.
Figure 7:
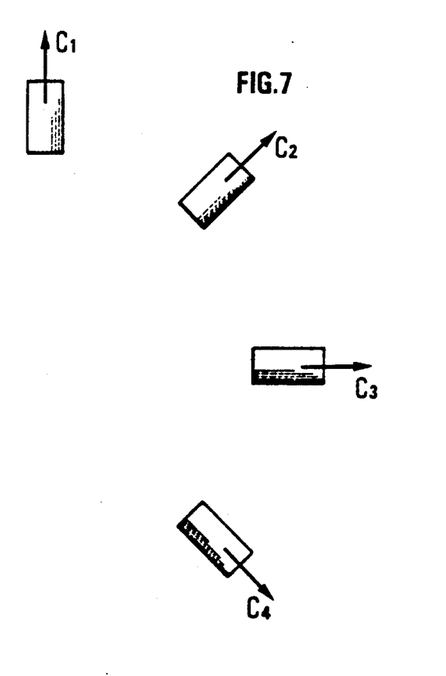
Figure 8:
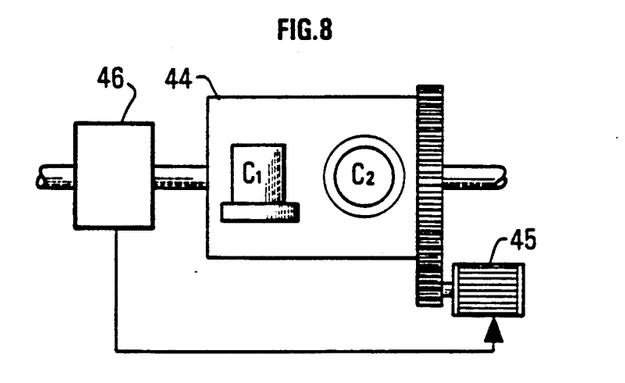
FIG. 8 shows a method of installing sensors on an orientable support.

As will be seen in connection with FIGS. 6 to 8, probe 2 comprises housings particularly for one or more directional geophones or accelerometers for picking up the acoustic waves reflected back by the discontinuities surrounding the well.

The length of body 4 and the possible stroke of guide element 8 between its locked withdrawn position and its advanced position in which it abuts against end-piece 5, are chosen so that the probe may be sufficiently removed from the tubular body 4.

The tubular body 4 is connected to a first tubular column or casing 20 formed by interconnecting several identical tube sections for example together.

At the opposite end of casing 20 is fixed a second guide block 21 comprising a tubular body 22 similar to body 4. It comprises a compartment 22a communicating with the outside of the body through longitudinal grooves 23 formed through its wall. A seismic source 24 is disposed in compartment 22a. A vibratory source may for example be used and particularly a magnetostrictive or piezoelectric constant frequency source. Its vibration frequency is chosen in the intermediate frequency range, i.e. of the order of a few kHz. A sparker may also be used having a wide transmission spectrum.

Figure 4:
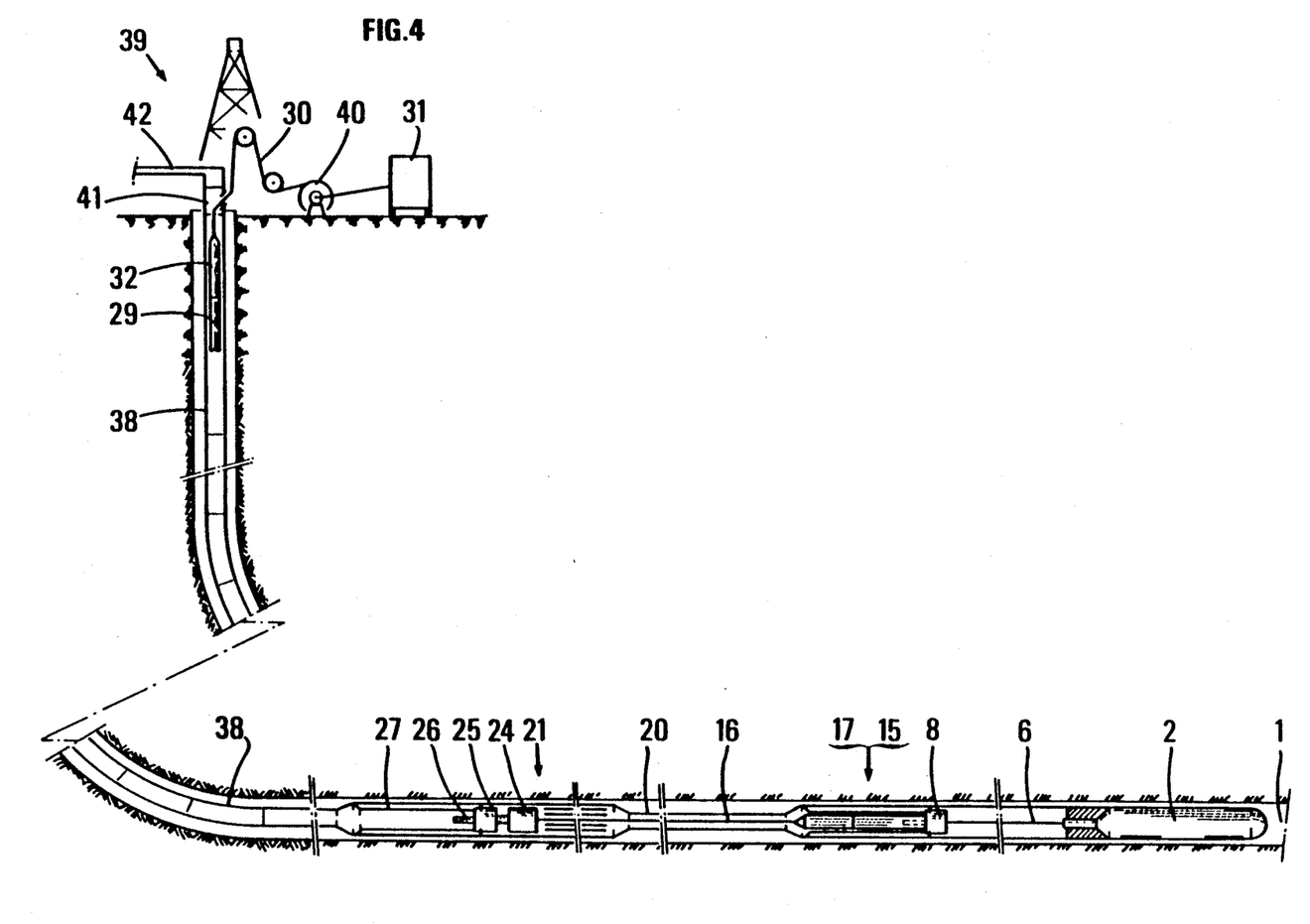
FIG. 4 shows a third step in which the transmission-reception assembly is connected to a surface control and recording assembly, after being brought as far as a very deviated well portion.

On the side opposite casing 20, the source is connected to a guide element 25 whose cross section is adapted to the inner section of the second tubular body 21. On this element 25 is fixed a multi-contact male plug 26 oriented along the axis of body 21 and disposed in the center of a tubular guide extension 27. A collar 28 facilitates guiding towards plug 26 of a multi-contact female socket 29 connected to a second multi-conductor cable 30 for connecting the transmission-reception assembly 2, 24 to a central control and recording assembly 31 (C.F. FIG. 4) disposed outside the well. Similarly, the female socket 29 has mounted thereover a weighting bar 32 and comprises means for locking it in the plugged-in position which may be remote controlled from the surface. These locking means may for example be electric dogs 33 engaging in matching grooves 34 situated at the base of the tubular extension 27. The electric continuity between the contacts of the male plug 26 and the conductors of cable 16 is provided by conducting lines disposed inside source 24 and not shown.

The guide element 25 is also provided with locking means 35 which may be remote controlled from the surface, formed for example by electric dogs which engage in grooves 36 formed in the wall of the second tubular body 21. The assembly formed by source 24 and its guide element 25 is able to move inside body 21 between a withdrawn position in which collar 28 abuts against a shoulder 27 of the inner wall and in which the locking means face the grooves 36, and an advanced position. The travel distance of this assembly 24, 25 in body 22 between the two positions is substantially equal to that of the guide element 8 inside the first tubular body 1.

Similarly, collar 28 and the wall of the second body comprise openings 28a, 21a and the guide element 25 has channels 25a passing therethrough so that a fluid stream may be formed between the inside and outside of tubular body 21.

The latter, at its end opposite source 24, is connected to a second tubular column of casing 38 formed by interconnection of tube sections and making it possible by successive additions to conduct the transmission-reception assembly as far as the depth required even in very deviated well portions. The operation is carried out using a handling device 39 (FIG. 4) of a type known per se in the drilling field. The multi-conductor cable 30 unwinding from reel 40 is lowered as far as the second body 21 along column 38.

In an arrangement known particularly from the French patent 2 547 861, the connection between the third multi-conductor cable 30 and the central assembly 31 is facilitated by using a special connection with lateral window 40, known by specialists as side entry sub, shown schematically in FIG. 4. When delayed connection of the female socket 29 on the male plug 26 is required in the second tubular body 21, after lowering the transmission-reception assembly, hydraulic propulsion is preferably used. Column 34 is capped by an injection head 42. The fluid stream formed inside the column and return takes place through orifices 28a and 21a, channels 25a through guide element 25 and the annular space between the column and the well.

Probe 2 may comprise anchorage arms 43 folded along the body during lowering thereof. An electrohydraulic control system of the type described for example in the French patent 2 501 380 may be used for moving arms 43 apart. Opening act of the arms results in applying the body of the probe against the wall of the well during the successive transmission-reception cycles. The anchorage arms 43 may also be offset as shown in the French patent 2 609 100.

The probe may advantageously comprise several directional sensors whose axes are disposed so as to pick-up signals in several different directions. Tri-axial geophones and/or accelerometers may for example be used whose axes are orthogonal two by two (see FIG. 6) or else blocks of four sensors C1, C2, C3, C4 whose axes are in the same plane at 45° from each other, as shown schematically in FIG. 7. The assembly of sensors is preferably disposed on an orientable support 44 (FIG. 8) which may be brought into a given angular position with respect to the body of probe 2 by actuating an electric motor 45. The action on the motor for introducing an appropriate angular correction is determined by orientation measurement using a known type pendulum 46.

Figure 9:
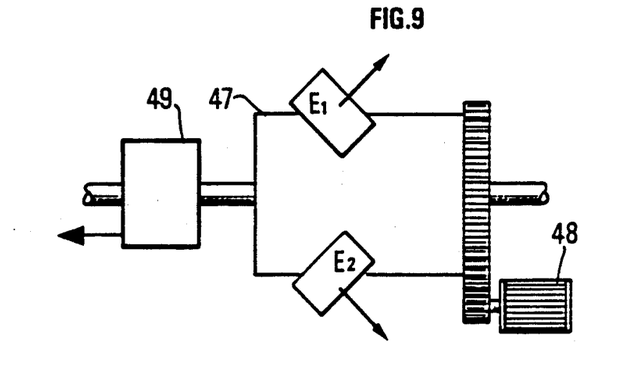
FIG. 9 shows a method of installing several vibrators on an orientable support.

Source 24 may be omnidirectional but, in the same way, a source may be used (FIG. 9) formed of one or more transmission elements E1, E2 mounted on a support 47 which can be oriented by the action of an electric motor 48 which is remote controlled from the surface. The indications concerning the effective orientation of the transmission units E1, E2 are measured by an angular deviation measurement means such as a pendulum 49 and transmitted to the operator by the multi-conductor cable 30.

For the needs of seismic exploration, it is possible to use a source formed of several transmission elements spaced apart along the axis of the well.

The positioning of the transmission-reception device in an inclined well portion is achieved as described hereafter and illustrated in FIGS. 2–5.

Figure 2:
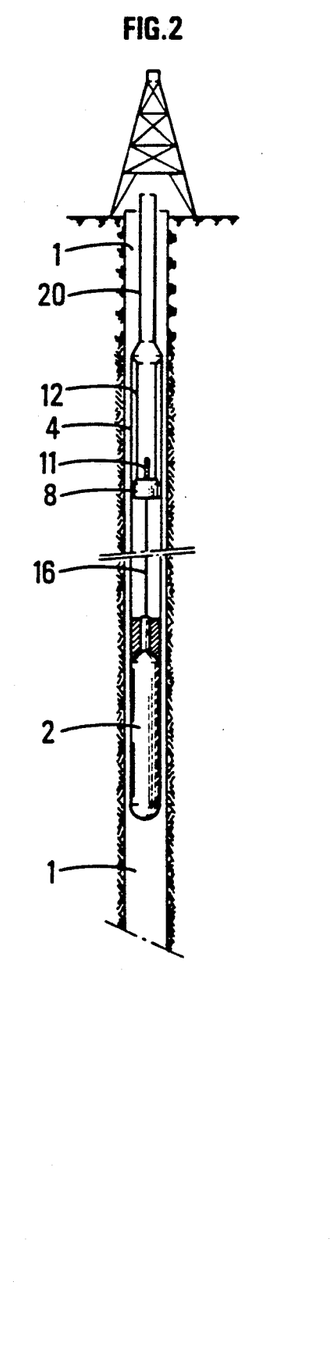
FIG. 2 shows a first step for positioning the probe in the well.

Probe 2 fixed to its guide block 3 is first of all inserted into well 1. By successive connections of a number of casing sections, forming the second tubular column 20, the assembly is lowered to a given depth (FIG. 2).

Figure 3:
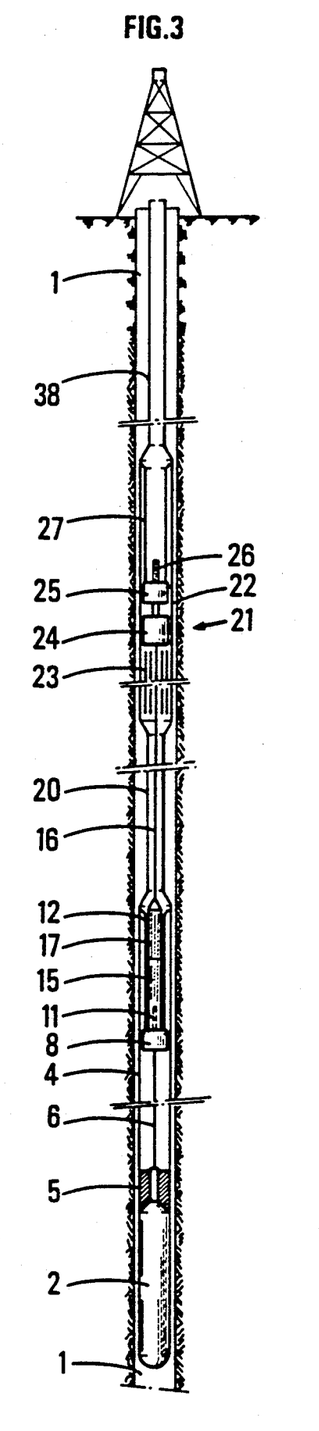
FIG. 3 shows a second step where the source is added and connected to the probe.

Then the first female socket 15 is inserted into the well at the end of the second multi-conductor cable 16. Weighted by bar 17, it descends under its own weight until it is engaged on the male plug 11. The locking means 18 are then actuated so as to secure plug 11 to the first tubular body 4. Then the second tubular body 22 containing the source 24 is fixed to column 20 (FIG. 3).

Then the second tubular body 22 is connected to a first casing section and, by successive connections, the second rigid column 38 is formed. Thus, the transmission-reception assembly 2, 24 is lowered to the well portion where the seismic prospection operations are to be carried out (FIG. 4).

The special connection 41 is positioned. The third multi-conductor cable 13 having at its end the second female socket 29 weighted by its bar 32 is introduced into column 38. The special connection 41 is covered with an injection head 42 and a fluid stream is formed so as to propel the weighted socket 29 towards the male plug 26 at the lower end of column 38 until the connecting means 33 are locked. The transmission-reception assembly is then operative.

Figure 10A:
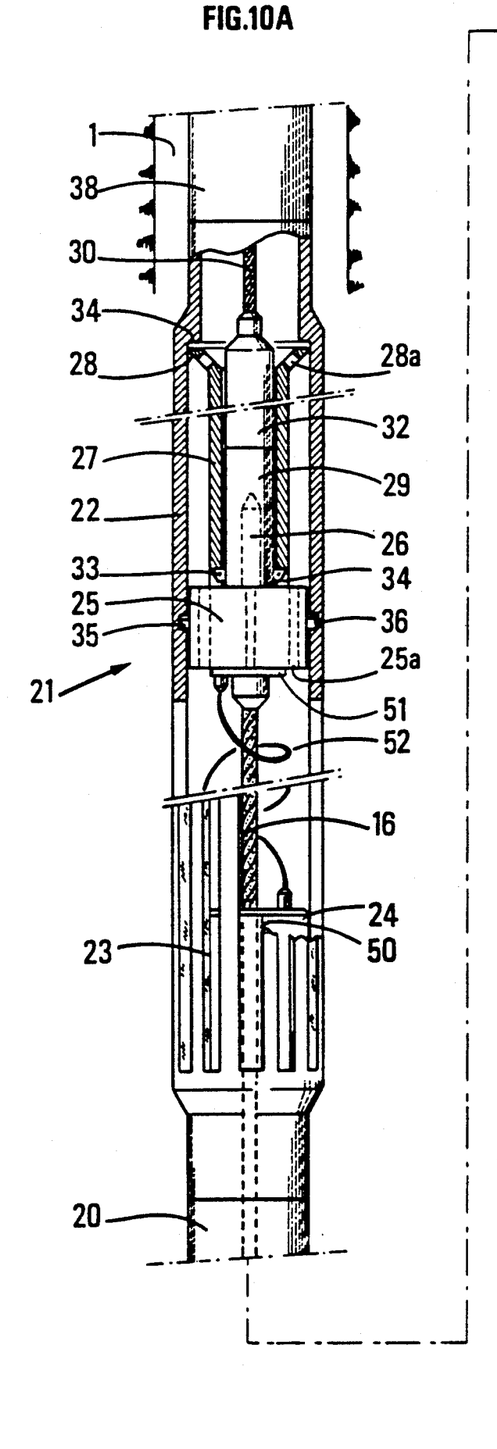
FIGS. 10A and 10B show a second embodiment of the transmission-reception device.
Figure 10B:
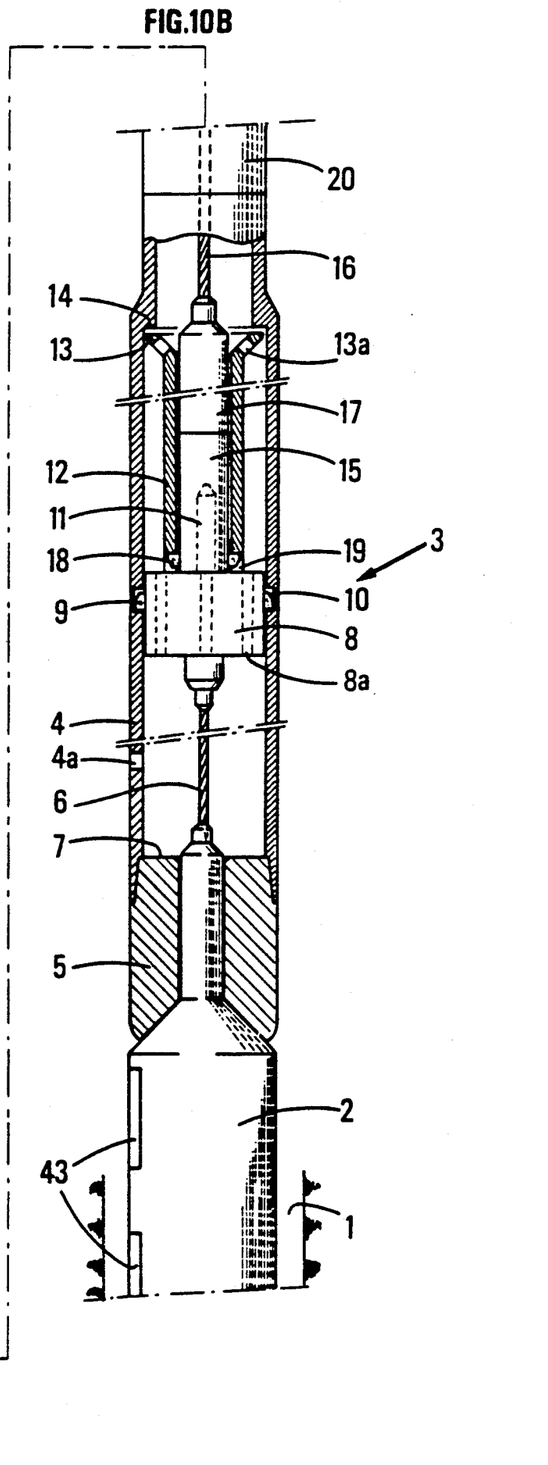

In the embodiment shown in FIG. 10, source 24 is fixed in the lower portion of the second tubular body 21. A passage 50 is formed along its axis for cable 16 connecting together the two guide elements 8 and 25 in operation so as to permit simultaneous displacement thereof when a tractive force is exerted on cable 30 by means of the control device 39 (FIG. 4).

The electric power supply for source 24 is provided by a secondary connection means disposed between the source and the multi-contact plug 26 of the guide element 25. This connection means comprises a junction box 51 for connecting one or more contacts of the multi-contact plug 26 to a secondary control cable 52 connected to source 24. Cable 52 is sufficiently loose to allow movement of guide element 25 inside body 22.

The method of progressively positioning the transmission-reception assembly is practically the same as that described above.

Figure 11:
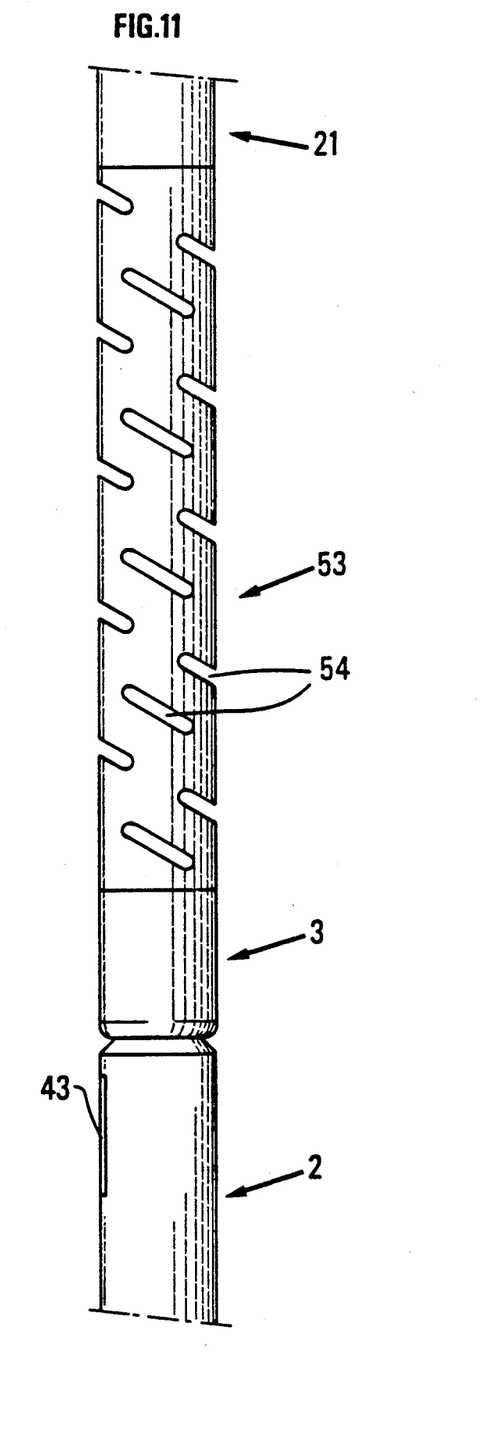
FIG. 11 shows a partial view of the column connecting the source to the probe and having damping means.

Whatever the embodiment chosen, source 24 is preferably connected to probe 2 by a column portion 20 having signal damping means so as to attenuate or delay the waves which are propagated along the tubes or in the fluid of the well. A column portion 53 may for example be used (FIG. 11) whose wall is provided, in an arrangement known per se, with openings 54 such as thin slits spaced apart about its periphery. The connection between the source and the probe may further be formed by a column portion made from a material capable of damping the vibrations or else by coating with layers of damping materials.

The down-hole electric connection between the central assembly and the transmission-reception assembly having been provided as seen above, a number of additional sections are added so as to bring the device to the position chosen for the seismic exploration operations to be carried out.

Figure 5:
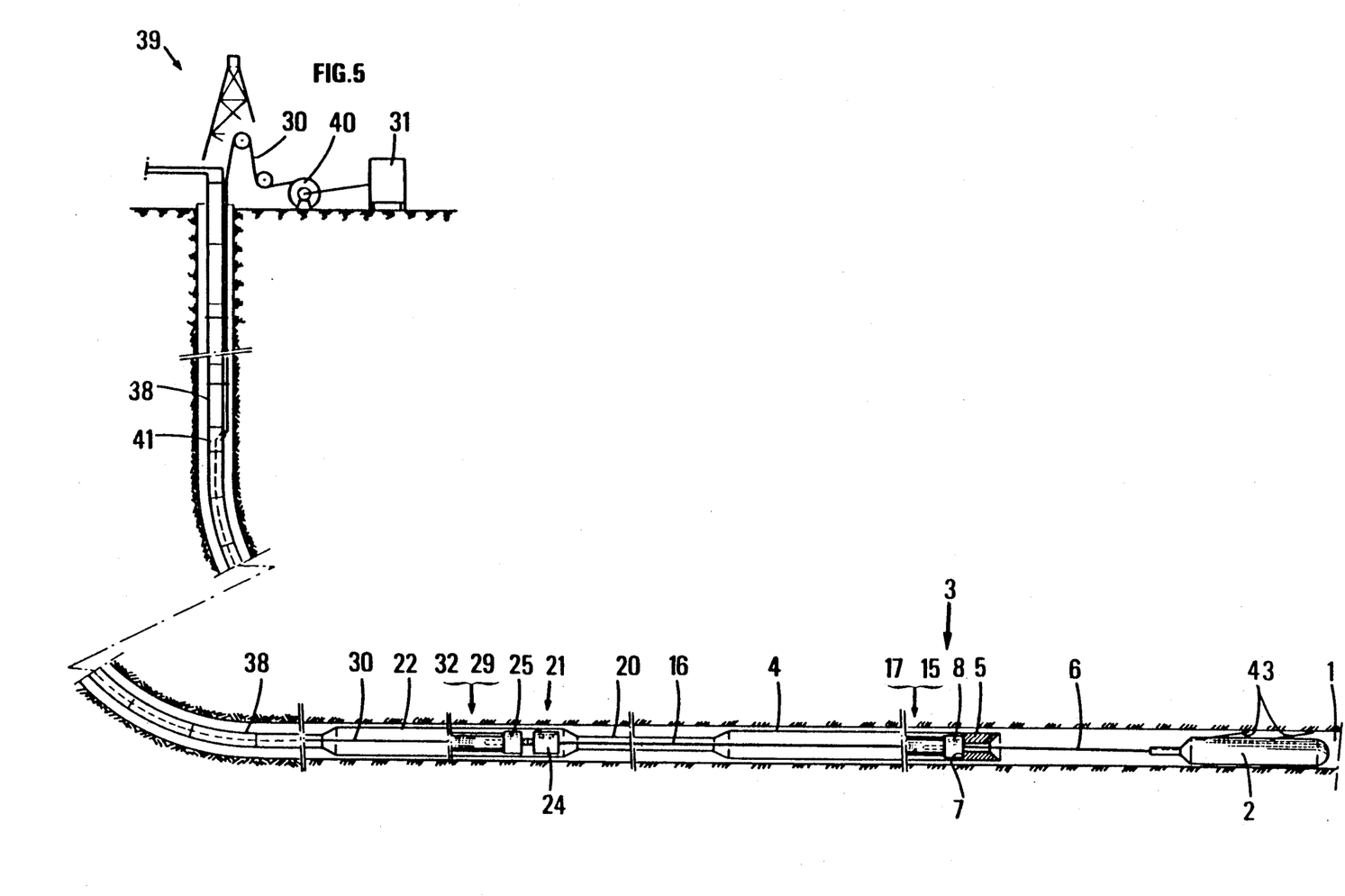
FIG. 5 shows the mechanical uncoupling of the probe before the beginning of the transmission-reception cycles.

The probe 2 is first of separated from its guide block 3.

Such separation is possible after releasing the locking means 9 and 32 controlled from the surface central assembly 31. The two guide elements 8 and 25 connected respectively to probe 2 and to source 24 are caused to slide in their respective bodies 4, 22 by a fluid thrust, the injection head being re-positioned. Probe 22 is freed from its seat against end-piece 5.

The arms 43 of probe 2 may also be anchored to the wall of the well by raising column 30 so as to bring the guide element 8 into abutment against end-piece 5. Preferably, the two operations are combined for facilitating extraction.

Cable 6 is then slackened so as to mechanically uncouple the body of the probe 5 from the guide block 3 and remove the probe body from the vibrations of the rigid column 30, 38.

Then several transmission-reception cycles are carried out. The signals received by the directional sensors C are transmitted to the central control and recording assembly 31 by conductors incorporated in cables 6, 16 and 30. The electric connection between these conductors and assembly 31 is provided in a way known per se by a set of brushes rubbing against collector rings fast with the shaft of reel 36.

Once the measurements have been made at the first station, the arms of the probe are released, then column 30 is raised by pulling probe 2 as far as the second measurement station, for example 5 or 10 meters closer to the surface. Probe 2 is again anchored and column 38 is lowered again slightly so as to slacken cable 6. At the upper end of casing 38 tube sections are removed and the cable wound on reel 40.

The same procedure is repeated at each station, until the special connection 41 has come substantially back to the level of the surface. After closing arms 43 of the probe, a tractive force is then exerted on the transmission cable 30 so as to cause the guide elements 8, 25 to slide towards their respective withdrawn positions and by a control the locking means 9, 33 are triggered so as to lock them to the two bodies 4, 22. Probe 2 comes back in abutment against stop 5.

By acting on the locking means 33, the weighted socket 29 is released and cable 30 is raised. After the second body 22 has returned to the surface, the weighted socket 15 is released. The transmitter portion of the device may then be removed from column 20. The withdrawing operation continues until probe 2 returns to the surface.

The special connection 41 is removed. Finally probe 2 and guide element 3 are raised in the same way as they had been lowered.

For this method, series of measurements or work can be carried out in horizontal well zones which are highly inclined (with respect to the vertical), even vertical.

The method described makes it possible to obtain particularly interesting seismic profiles when the well is horizontal or very deviated and when it is desired to recognize precisely, and in zones which would otherwise be difficult to explore by sounding, geological formations such as the roof of a reservoir or layers located on each side of the horizontal or highly inclined portion of the well.

A transmission frequency in the 200 to 2000 Hz band has been chosen preferably. In formations in which the speed of the waves is about 3000 m/s for example, resolution is obtained between 0.35 and 3.75 m. With a frequency of this kind, the useful range of the waves is 50 to 100 m and their power of resolution is about 1 m.

Without departing from the scope of the invention, several measurement probes such as probe 2 may be used held spaced apart along the well by fairly rigid connection means for transmitting the axial thrusts required for advancing the device but capable of attenuating the direct transmission therebetween of the waves received.

The device according to the invention lends itself well to operations in very deviated wells. It may however of course be used in vertical or substantially vertical wells.

The examples described relate to a transmission-reception device having seismic or acoustic wave transmission-reception means. Still within the scope of the invention, the means described may be replaced by any other signal transmission-reception means of any type for benefiting from the advantages related to the overall structure of the device.

What is claimed is:

1. A method of prospection in wells using acoustic waves and particularly in deviated wells, comprising:
   introducing into a well an acoustic wave transmission and reception assembly comprising:
      reception means having at least one probe with directional sensor means for sensing acoustic waves and means for applying said sensor means against the wall of the well, said probe being connected to a surface control device by a rigid column and being able to be mechanically uncoupled therefrom intermittently,
      acoustic wave transmitting means comprising at least one acoustic wave source inserted in the rigid column between the probe and the control device,
      a multi-conductor cable for controlling the transmission and reception assembly to a control and recording assembly disposed on the surface, and
      a connection system for automatically providing a delayed electric connection between successively the source and the probe after the probe has been lowered in the well and between the control and recording assembly and said source after the source has been lowered in the well;
   (b) mechanically uncoupling said probe from the rigid column and applying said sensor means against the wall of the well;
   (c) said sensor means being held in a fixed position, triggering said source from said acoustic and recording assembly to cause the transmission of acoustic waves;
   (d) transmitting to the control and recording assembly through the multi-conductor cable, signals reflected by the discontinuities surrounding the well and received by the sensor means;
   (e) pulling on the rigid column for displacing successively said transmission and reception assembly to a plurality of positions along the well, and mechanically coupling said probe with the rigid column and at each position repeating the two preceding steps.

2. An exploration device adapted to be lowered into wells and particularly deviated wells comprising at least one wall probe having a cross section adapted to that of the well to be explored with directional sensor means for sensing acoustic waves and retractable anchoring means for intermittently coupling said sensor means with the wall of the well, a rigid tubular column for connecting said probe to a control installation on the surface, acoustic wave transmitting means inserted on said rigid column between the probe and said control installation, said transmitting means including at least one wave source and a multi-conductor cable for connecting at least the probe to a surface control and recording assembly, wherein at least the probe is displaceable between an extended position away from an end portion of the rigid column and a closer position in contact with said end portion.

3. The device as claimed in claim 2, further comprising a first connection system for providing a delayed electric connection of the probe to said wave source after said probe has been lowered into the well and a second connection system for providing a delayed electric connection of said source to the control and recording assembly and the source after said wave source has been lowered into the well.

4. The device as claimed in claim 2 or 3 comprising a first guide block and a second guide block, respectively, associated with said probe and said source, said first and second guide block each comprising a tubular body fixed to the rigid column and a guide member movable in the body between a withdrawn position and an advanced position, means for locking each of said first and second guide members in the withdrawn position thereof with respect to said tubular bodies and hydraulic means, cooperating with said two guide members for pushing said guide members towards their respective advanced positions, the probe being mechanically uncoupled from the associated tubular body in said advanced position.

5. The device as claimed in claim 4, wherein said first connection system includes a first electric connection plug fixed to said first guide member associated with the probe, a first multi-conductor cable element which is connected to said source, and a first electric socket usable in a liquid environment and connected with said first multi-conductor cable, said secodn conneciton system includes a second electric connection plug fixed to said second guide member associated with the source, a second multi-conductor cable element, which is connected to said surface control and recording assembly and a second electric socket usable in a liquid environment and connected with said second multi-conductor cable, guide means for guiding, respectively, the first and second sockets to an engagement position providing electric connection thereof to the first and second connection plugs and means for providing a fluid flow in said column, wherein said first and second connection sockets are pushed towards their respective engagement positions in contact, respectively, with said first and second connection plugs, and means for locking said first and second sockets in their engagement positions.

6. The device as claimed in claim 5, comprising means for securing the source to the first multi-conductor cable element so as to move the probe and the source together between their respective withdrawn and advanced positions.

7. The device as claimed in claim 2, wherein said source comprises at least one sparker.

8. The device as claimed in claim 2, wherein said source comprises at least one sparker.

9. The device as claimed in claim 7, wherein each vibrator is of the magnetostrictive piezoelectric type.

10. The device as claimed in claim 7, wherein each vibrator is associated with transmitting means connected with said each vibrator for transmitting signals whose frequency is chosen so that the resolution power in the formations through which the well passes is of the order of 1 m.

11. The device as claimed in claim 2, wherein said sensor means comprise several directional sensors whose axes are directed in different directions.

12. The device as claimed in claim 11, wherein said sensor means are disposed on a support which is orientable with respect to the probe.

13. The device as claimed in claim 12, comprising a means connected to the surface control and recording assembly for detecting the orientation of said support and a drive means which can be remotely actuated for changing the orientation of said support.

14. The device as claimed in claim 7, wherein each vibrator is connected with a pulsed acoustic signal generator.

15. The device as claimed in claim 2, wherein said source comprises several units spaced apart from each other along the rigid column.

16. The device as claimed in claim 2, further comprising a plurality of probes spaced apart from each other along said rigid column.

17. The device as claimed in claim 4 or 5, wherein said source is fixed to the body of the second guide block and is provided with a passageway along its axis for the combined movement of the first and second guide members when the members are connected together by means of said first multi-conductor cable, and said device also comprises auxiliary conductor means for connecting said source to said second multi-conductor cable.

18. The device as claimed in claim 2, further comprising damping means for damping the waves preparing along the well directly between the source and the probe.

* * * * *